(12) United States Patent
Ferguson

(10) Patent No.: US 7,759,906 B2
(45) Date of Patent: Jul. 20, 2010

(54) LINEARLY REGULATED BATTERY CHARGER

(75) Inventor: Bruce R. Ferguson, Anaheim, CA (US)

(73) Assignee: Microsemi Corporation, Irvine, CA (US)

( * ) Notice: Subject to any disclaimer, the term of this patent is extended or adjusted under 35 U.S.C. 154(b) by 0 days.

(21) Appl. No.: 12/430,426

(22) Filed: Apr. 27, 2009

(65) Prior Publication Data

US 2009/0206794 A1    Aug. 20, 2009

Related U.S. Application Data

(62) Division of application No. 10/760,126, filed on Jan. 16, 2004, now Pat. No. 7,525,291.

(60) Provisional application No. 60/441,715, filed on Jan. 21, 2003.

(51) Int. Cl.
 *H02J 7/06* (2006.01)
(52) U.S. Cl. .................. 320/164; 320/163; 320/128
(58) Field of Classification Search ................. 320/110, 320/163, 164, 128
See application file for complete search history.

(56) References Cited

U.S. PATENT DOCUMENTS

| | | |
|---|---|---|
| 4,901,217 A | 2/1990 | Wilson |
| 5,239,495 A | 8/1993 | Nanno et al. |
| 5,313,642 A | 5/1994 | Seigel |
| 5,349,282 A | 9/1994 | McClure |
| 5,465,039 A | 11/1995 | Narita et al. |
| 5,514,859 A | 5/1996 | Seigel |
| 5,621,299 A * | 4/1997 | Krall ........................ 320/103 |
| 5,625,275 A | 4/1997 | Tanikawa et al. |
| 5,729,120 A | 3/1998 | Stich et al. |
| 5,739,596 A * | 4/1998 | Takizawa et al. ............. 307/66 |
| 5,764,028 A | 6/1998 | Freiman et al. |
| 5,786,682 A | 7/1998 | Aiken et al. |
| 5,884,086 A | 3/1999 | Amoni et al. |
| 5,903,137 A | 5/1999 | Freiman et al. |
| 5,978,236 A | 11/1999 | Faberman et al. |
| 5,982,160 A | 11/1999 | Walters et al. |
| 5,986,437 A | 11/1999 | Lee |
| 6,000,042 A | 12/1999 | Henrie |
| 6,058,034 A | 5/2000 | Cummings et al. |
| 6,114,842 A | 9/2000 | Simpson et al. |
| 6,130,813 A | 10/2000 | Kates et al. |
| 6,133,712 A | 10/2000 | Yeon |
| 6,147,682 A | 11/2000 | Kim |
| 6,169,384 B1 | 1/2001 | Shannon |
| 6,170,062 B1 | 1/2001 | Henrie |
| 6,184,652 B1 | 2/2001 | Yang |

(Continued)

*Primary Examiner*—Edward Tso
*Assistant Examiner*—Aaron Piggush
(74) *Attorney, Agent, or Firm*—Knobbe, Martens, Olson & Bear, LLP

(57) ABSTRACT

A battery charger for an electronic device receives current limited power from an external power source, such as a Universal Serial Bus power interface. The battery charger can linearly regulate a charging current to an internal battery and limit the charging current so as not to demand current in excess of what the external power source can provide. A bi-directional pass element coupled between a system power terminal and the internal battery controls the charging current and effectively isolates the internal battery from a system load during charging of the battery while providing a low impedance path from the internal battery to the system load during discharging of the battery.

18 Claims, 4 Drawing Sheets

U.S. PATENT DOCUMENTS

| | | |
|---|---|---|
| 6,211,649 B1 | 4/2001 | Matsuda |
| 6,222,347 B1 | 4/2001 | Gong |
| 6,246,214 B1 * | 6/2001 | Oglesbee .................... 320/136 |
| 6,255,800 B1 | 7/2001 | Bork |
| 6,337,557 B1 | 1/2002 | Kates et al. |
| 6,418,075 B2 | 7/2002 | Shimano et al. |
| 6,465,987 B1 | 10/2002 | Haas et al. |
| 6,861,824 B1 * | 3/2005 | Liu et al. .................... 320/164 |
| 2001/0021659 A1 | 9/2001 | Okamura |
| 2001/0045813 A1 | 11/2001 | Suzuki et al. |
| 2002/0005707 A1 | 1/2002 | Kerai et al. |
| 2002/0021164 A1 * | 2/2002 | Fugate et al. ............... 327/534 |
| 2002/0038432 A1 | 3/2002 | Hsu |
| 2002/0061739 A1 | 5/2002 | Nakamura et al. |
| 2002/0130638 A1 | 9/2002 | Sherman |
| 2003/0054703 A1 * | 3/2003 | Fischer et al. ............... 439/894 |

\* cited by examiner

LINEARLY REGULATED BATTERY CHARGER

CLAIM FOR PRIORITY

This application is a divisional of copending U.S. application Ser. No. 10/760,126, filed on Jan. 16, 2004 and entitled LINEARLY REGULATED BATTERY CHARGER, which claims the benefit of priority under 35 U.S.C. §119(e) of U.S. Provisional Application No. 60/441,715, filed on Jan. 21, 2003 and entitled USB BATTERY CHARGER. The present application incorporates the foregoing disclosures herein by reference.

BACKGROUND OF THE INVENTION

1. Field of the Invention

The present invention relates generally to battery chargers and more particularly to a battery charger that receives power from a limited power source, such as a Universal Serial Bus (USB) power interface.

2. Description of the Related Art

Many electronic devices operate with a low direct current (DC) voltage supply such as, for example, 5 volts DC. The DC voltage supply may be derived from an alternating current (AC) adapter (e.g., by transforming, rectification and filtering of an AC voltage), or it may be supplied by one or more internal batteries of the electronic devices. Often, such a device obtains DC power from the AC adapter when the AC adapter is connected to the device and to an AC source and obtains power from the batteries when the AC adapter is not supplying power. If the batteries are rechargeable batteries, the device advantageously provides a portion of the DC power from the AC adapter to the batteries via a charging current to charge or to maintain the charge of the batteries.

Devices are presently available that are connectable to a USB interface of a computer system via a USB cable. Although a USB device may have an independent AC adapter to provide DC power to the device, a low power device may obtain power from the computer system via a conductor in the USB cable. If the USB device has internal rechargeable batteries, a portion of the DC power may be used by a charging circuit to charge or to maintain the charge of the batteries. Generally, the DC power available via the USB cable is current limited. Thus, if the batteries are being charged while the device is operating, sufficient current may not be available to sustain the proper operation of the device unless the current supplied to charge the batteries is limited. Thus, the charging current to the batteries is usually fixed and limited to the excess current available when the USB device is utilizing a maximum current. On the other hand, if the charging current to the batteries is always limited to the excess amount of current available when the device is operating at its maximum power, the amount of time required to charge the batteries may be excessive.

SUMMARY OF THE INVENTION

The present invention solves these and other problems by providing a battery charger that controls a charging current to a rechargeable battery. In one embodiment, a system load (e.g., a portable electronic device) can be powered by an internal battery, an external primary power source, or an external secondary power source. The battery can be charged or recharged by the external primary power source or the external secondary power source. A logic interface circuit (or a device controller) places a power control circuit (e.g., a battery charger) in one of three modes: 1) a sleep mode in which the internal battery is disconnected, 2) a discharge mode in which the internal battery discharges in a reverse direction through a pass element to power an electronic device, or 3) a charge mode in which one of the external power sources chargers the internal battery.

In one embodiment, a battery charger includes a dual input source selector with a first input coupled to a primary power source and a second input coupled to a secondary power source. The dual input source selector selectively couples the primary power source or the secondary power source to a system power terminal of the electronic device. A battery controller (or a charging circuit) couples a rechargeable battery to the system power terminal.

In one embodiment, the primary power source is an AC adapter and the secondary power source is a USB power interface. Thus, the first input of the dual input source selector is coupled to an output of the AC adapter and the second input of the dual input source selector is coupled to an output of the USB power interface. Power from either the AC adapter or the USB power interface is provided to a system load coupled to the system power terminal. At the same time, power may be provided to the rechargeable battery which is also coupled to the system power terminal.

The first input of the dual input source selector (or the first power input) and the second input of the dual input source selector (or the second power input) are diode OR-ed so that when only one power source is present, that power source will be able to power the electronic device and to charge the battery. Furthermore, if either power input is shorted to ground, the OR-ing diodes serve as isolation circuits that block current flow in a reverse direction from the system power terminal to the shorted power input, which would present an unwanted load to the other power input or the battery in a discharge mode.

In one embodiment, optional bypass transistors (e.g., P-channel MOSFETs or switches) are coupled across the respective OR-ing diodes (or isolation diodes) to selectively provide low impedance paths from the respective power inputs to the system power terminal. The bypass transistors effectively reduce the voltage drops across the respective isolation diodes when activated. Reducing the voltage drops across the isolation diodes ensures that there is adequate voltage to effectively charge the battery even on a low side of the power input regulation band. When the battery is in the discharge mode, the bypass transistors are turned off to prevent battery current from flowing to the power inputs.

Power may be available from both the primary power source and the secondary power source at the same time. In one embodiment, the dual source selector automatically disconnects the secondary power source from the system power terminal when power is available from the primary power source. For example, if the AC adapter is active while the USB power interface is enabled, the AC adapter provides power to the system power terminal and an overriding circuit shuts off any bypass transistors associated with the USB power interface to prevent reverse current from flowing to the USB power interface.

In one embodiment, a bi-directional device (or a pass element) in the battery controller couples a positive battery terminal to the system power terminal. The bi-directional device conducts a charging current in a first direction from the system power terminal to the positive battery terminal during charging of the battery and conducts a discharging current in a second direction from the positive battery terminal to the system power terminal during discharging of the battery (e.g., when the battery is providing power to the system load). The bi-directional device advantageously isolates the battery from the system load in the charge mode and provides a low-impedance path from the battery to the system load in the discharge mode. The bi-directional device can fully disconnect the battery from the system power terminal during the sleep mode.

In one embodiment, a battery control loop senses a voltage difference between the system power terminal and the positive battery terminal. The battery control loop outputs a feedback control signal based on the voltage difference. A pass element driver accepts the feedback control signal and configures the bi-directional device to conduct a charging current when the voltage of the system power terminal is greater than the voltage of the positive battery terminal. The pass element driver configures the bi-directional device to conduct a discharging current when the voltage of the system power terminal is less than the voltage of the positive battery terminal. In another embodiment, a discharge command is provided to the battery control loop to configure the bi-directional device to operate in the discharge mode.

In one embodiment, the battery controller (or the charging circuit) linearly regulates the charging current of the bi-directional device. For example, current from the USB power interface is limited. A typical USB power interface can provide either 500 mW (e.g., 5 volts at 100 mA) or 2500 mW of power (e.g., 5 volts at 500 mA) depending on the configuration of the USB interface. A portable device plugged into the USB interface should not demand more power than what the USB power output can provide. Thus, when the battery charger receives power from the USB power interface, the charging current may be limited so as not to demand total supply current in excess of what the USB power interface can provide.

In one embodiment, a current sensor measures the total supply current being drawn from the USB interface. The charging circuit compares the total supply current with a predefined (e.g., a user defined limit or a maximum) current capability of the particular USB interface to determine whether any excess power is available to charge the battery and still remain in compliance with the USB standard (e.g., maintaining the total supply current at or below a predetermined or a maximum allowable current).

In one embodiment, an error amplifier compares an output of the current sensor to a selectable reference level corresponding to the predetermined (or maximum) allowable current of the USB interface. An output of the error amplifier overrides the battery control loop to reduce the charging current when the output of the current sensor indicates that the total supply current exceeds the maximum allowable current.

The ability to linearly control the charging current ensures that the battery receives all or a substantial portion of the current that is available from a computer system via a USB cable that is not used to operate a USB device at any given time. The available charging current advantageously decreases as current requirements for the USB device increases, and the available charging current advantageously increases as the current requirements for the USB device decreases.

In one embodiment, the bi-directional device in the battery controller is a field effect transistor (FET), such as a P-channel enhancement mode metal-oxide semiconductor FET (MOSFET). A body-connected source terminal is coupled to the system power terminal and a drain terminal is coupled to the positive battery terminal.

In another embodiment, the bi-directional device is a P-channel MOSFET with a configurable body contact. The configurable body contact is coupled to the system power terminal during a battery charge mode and coupled to a battery terminal during a battery discharge mode. In one embodiment, a comparator senses a voltage polarity across the source-drain terminals of the P-channel MOSFET to connect the body contact accordingly. The configurable body contact serves as a reference for the pass element driver. With the body contact connected to the source-drain terminal with a relatively higher voltage, the pass element driver can stop current from flowing in either direction through the bi-directional device by driving its gate voltage to logic high, thereby fully disconnecting the battery form the system power terminal. In one embodiment, a switching diode can be coupled across the P-channel MOSFET to assist in a transient response of the battery if a full disconnection from the system power terminal is not required.

The voltage at a gate terminal of a FET can be linearly adjusted to vary the impedance of the FET to control or to limit the level of the charging or discharging current. In one embodiment, the impedance is relatively higher during a discharge mode at light load levels in order to maintain a desired (or a minimum) reverse voltage across the source-drain terminals of the FET and to provide hysteresis between charge and discharge mode switching.

In one embodiment, a current limiting circuit is coupled between the USB power interface and the second input to ensure that the current supplied by the USB power interface does not exceed a predetermined level. The current limiting circuit helps to provide full USB current compliance even if current to the system load exceeds the specified limit of the USB power interface.

In one embodiment, the battery controller automatically enters a discharge mode so that the battery can assist the USB power interface in providing current to the system load when the supply current exceeds a predefined level. For example, the battery controller senses when the system power terminal voltage falls below the battery terminal voltage to indicate insufficient current is provided to the system load and begins to discharge the battery to provide additional current to the system load.

These and other objects and advantages of the present invention will become more fully apparent from the following description taken in conjunction with the accompanying drawings. For purpose of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE INVENTION

Figure 1:
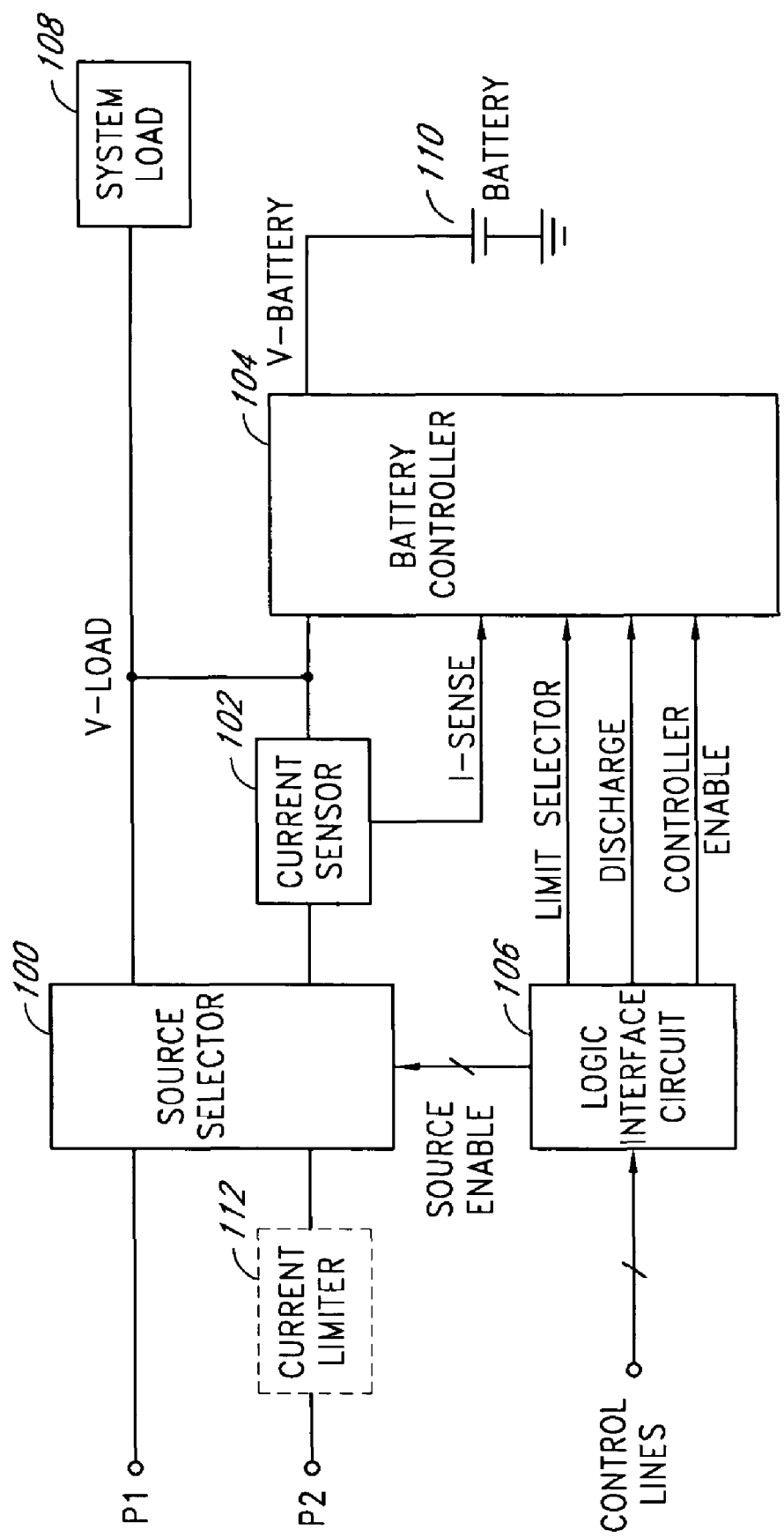
FIG. 1 is a block diagram of one embodiment of a battery charger in accordance with the present invention.

Embodiments of the present invention will be described hereinafter with reference to the drawings. FIG. 1 illustrates a block diagram of one embodiment of a battery charger. The battery charger includes a source selector 100, a current sensor 102 and a battery controller 104. The source selector 100 selectively couples either a primary power source (P1) or a secondary power source (P2) to a system power terminal (V-LOAD). The system power terminal provides a load current to a system load 108. In one embodiment, the voltage at the system power terminal is a relatively low DC voltage (e.g., 5 volts DC) and the system load 108 is a portable electronic device (e.g., a USB device).

In one embodiment, the secondary power source (e.g., a USB power interface or port) can supply a limited amount of current and an optional current limiter 112 is inserted between the secondary power source and an input to the source selector 100 to clamp the supply current from the secondary power source at a predetermined level.

The current sensor 102 is coupled in series between the secondary power source and the system power terminal to measure current supplied by the secondary power source. The current sensor 102 can be placed before or after the source selector 100. In the embodiment shown in FIG. 1, the current sensor 102 is placed between an output of the source selector 100 and the system power terminal. In one embodiment, the current sensor 102 outputs a sense signal (e.g., a current or a voltage) indicative of the supply current from the secondary power source. The sense signal (I-SENSE) is provided to the battery controller 104.

The battery controller 104 is coupled between the system power terminal and a battery 110. In one embodiment, the battery 110 is a rechargeable (or an internal) battery that supplies current to the system load 108 when the primary power source and the secondary power source do not supply sufficient current to the system load 108. The battery 110 can be charged or recharged by either of the power sources when the electronic device 108 is inactive or when the load current is less than a predefined (e.g., a maximum) current capability of the active power source. In one embodiment, the battery controller (or charging circuit) 104 controls a charging current supplied to the battery 110 by one of the power sources and a discharging current supplied by the battery 110 to the system load 108 using a bi-directional device.

In one embodiment, the battery controller 104 linearly adjusts (or regulates) the charging current and may limit the charging current to ensure that the supply current from the secondary power source is less than a predefined level. For example, the charging current may be scaled back when the system load 108 demands more power to allow the combination of the charging current and the load current to be less than the predefined level. The ability to linearly control the charging current ensures that the battery controller 104 can utilize a desired portion or substantially all of the available power to charge the battery 110. The available charging current advantageously decreases as the load current increases, and the available charging current advantageously increases as the load current decreases.

In one embodiment, a logic interface circuit 106 accepts inputs from one or more control lines and generates control signals for the source selector 100 and the battery controller 104. For example, the control lines can receive information from a user input, a computer system, a controller for the electronic device (or system load) 108, or sensors to generate the appropriate control signals. In one embodiment, a sensor detects for availability of power from one of the power sources and causes the logic interface circuit 106 to output one or more source enable signals to the source selector 100 to couple the available power source to the system power terminal. For example, an AC detection logic signal is optionally available to the logic interface circuit 106 to indicate when power from an AC adapter is available.

In one embodiment, the logic interface circuit 106 outputs a plurality of control signals to the battery controller 104. For example, the logic interface circuit 106 outputs a controller enable signal to configure the mode of operation for the battery controller 104. In a first state, the controller enable signal causes the battery controller 104 to be in a shutdown (or sleep) mode which disconnects the battery 110 from the system power terminal. In a second state, the controller enable signal configures the battery controller 104 for normal operations with a battery control loop determining whether the battery controller 104 is in a charge mode or a discharge mode. In one embodiment, the logic interface circuit 106 also outputs a discharge command to force the battery controller 104 into the discharge mode and a limit selector to select a desired reference level for limiting the charging current. Further details of the battery controller 104 will be described below.

Figure 2:
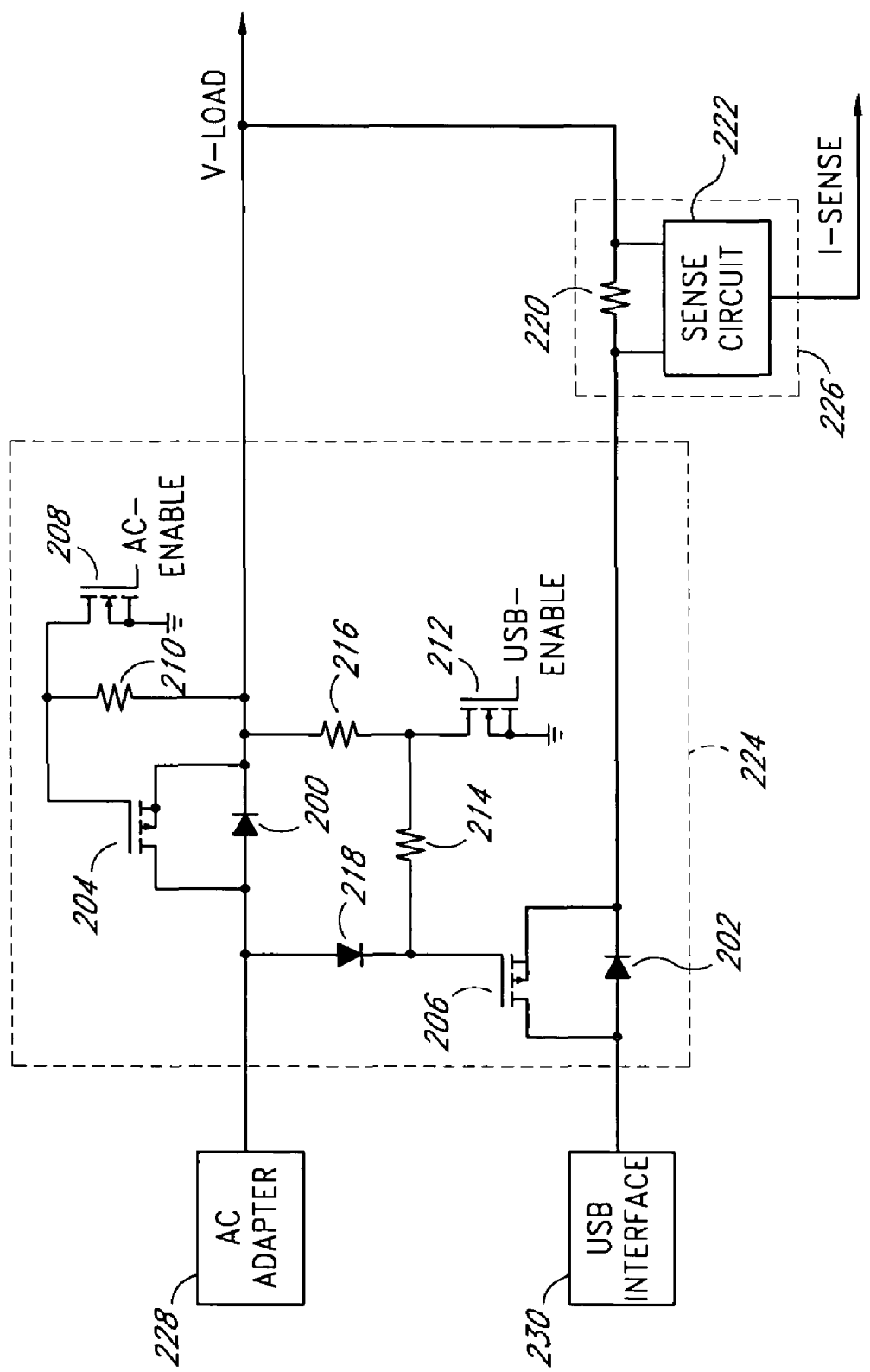
FIG. 2 is a schematic diagram of a portion of the battery charger shown in FIG. 1.

FIG. 2 is a schematic diagram of a portion of the battery charger shown in FIG. 1. An AC adapter 228 (e.g., a primary power source) is coupled to a first input of a source selector 224, and a USB power interface 230 (e.g., a secondary power source) is coupled to a second input of the source selector 224. The AC adapter 228 translates (e.g., by transformation, rectification and filtering) an AC voltage into a relatively low DC voltage for the first input. The USB power interface 230 receives DC power from a computer system via a USB cable for the second input.

In one embodiment, the source selector 224 includes at least two isolation circuits (e.g., isolation diodes) 200, 202. The first isolation diode 200 is coupled between the first input and a system power terminal (V-LOAD). For example, an anode of the first isolation diode 200 is coupled to the first input and a cathode of the first isolation diode 200 is coupled to the system power terminal. The second isolation diode 202 is coupled between the second input and an intermediate node. For example, the second isolation diode 202 has an anode coupled to the second input and a cathode coupled to the intermediate node. The intermediate node can be connected directly to the system power terminal. However, in an embodiment in which current sensing is desired, a series-connected sensing resistor 220 couples the intermediate node to the system power terminal.

Power from either the AC adapter 228 or the USB power interface 230 can be provided to the system power terminal via the respective isolation diodes 200, 202. An electronic device (e.g., a USB compatible device) is coupled to the system power terminal to obtain power for normal operations. At the same time, power may be provided to a rechargeable battery which is also coupled to the system power terminal. In other words, the first input and the second input of the source selector 224 are diode OR-ed so that when only one power source is present, that power source will be able to power the electronic device and to charge the battery. Furthermore, if either input is shorted to ground, the OR-ing diodes (or isolation diodes) 200, 202 block current flow in a reverse direction from the system power terminal to the shorted input.

In one embodiment, bypass transistors 204, 206 are coupled across the respective isolation diodes 200, 202 to reduce the voltage drops across the isolation diodes 200, 202 when the isolation diodes 200, 202 are conducting. The bypass transistors 204, 206 can be selectively activated to provide low impedance paths between the respective inputs of the source selector 224 to the system power terminal. The bypass transistors 204, 206 facilitate lower input voltage ranges for powering the electronic device and charging the battery. When the battery is in a discharge mode, the bypass transistors 204, 206 are turned off to prevent battery current from flowing to the power sources.

In one embodiment, the bypass transistors 204, 206 are P-channel MOSFETs with source terminals coupled to the respective cathodes of the isolation diodes 200, 202 and drain terminals coupled to the respective anodes of the isolation diodes 200, 202. The bypass transistors 204, 206 can be turned on or off by applying control logic to the respective gate terminals of the bypass transistors 204, 206.

In one embodiment, the gate voltage of the first bypass transistor 204 is pulled up to logic high by a first pull-up resistor 210 coupled between the gate terminal of the first bypass transistor 204 and the system power terminal. If the first bypass transistor 204 is a P-type transistor, the logic high effectively turns off the first bypass transistor 204. To turn on the first bypass transistor 204, a first pull-down transistor (or N-channel switch) 208, controlled by an AC-enable signal, is coupled between the gate terminal of the first bypass transistor 204 and ground. For example, the first pull-down transistor 208 has a drain terminal coupled to the gate terminal of the first bypass transistor 204, a source terminal coupled to ground, and a gate terminal coupled to the AC-enable signal. When the AC-enable signal is activated (or logic high), the first pull-down transistor 208 overrides the first pull-up resistor 210 and pulls the gate terminal of the first bypass transistor 204 to logic low, effectively turning on the first bypass transistor 204.

In a similar manner, the second bypass transistor 206 has a second pull-up resistor 216 and a second pull-down transistor 212 to control its on/off states. In one embodiment, the second pull-up resistor 216 is coupled between the system power terminal and a drain terminal of the second pull-down transistor 212. The second pull-down transistor 212 has a source terminal coupled to ground and a gate terminal controlled by a USB-enable signal. The drain terminal of the second pull-down transistor 212 is coupled to the gate terminal of the second bypass transistor 206 via a series-connected current-limiting resistor 214.

The current-limiting resistor 214 advantageously allows for an overriding circuit (e.g., an override diode) 218 to be coupled between the first input of the source selector 224 and the gate terminal of the second bypass transistor 206. Power may be available from both the AC adapter 228 and the USB power interface 230 at the same time. The override diode 218 automatically turns off the second bypass transistor 206 when power is available from the AC adapter 228, overriding any control by the second pull-down transistor 212 or the second pull-up resistor 216. Turning off the second bypass transistor 206 effectively isolations the USB power interface 230 from the system power terminal when the AC adapter 228 is active.

The power available from the USB power interface 230 is limited. For example, the USB power interface 230 may have a maximum current rating of 100 mA or 500 mA at 5 volts. In one embodiment, a current sensor 226 monitors current from the USB power interface 230 to ensure compliance with the maximum current rating. The current sensor 226 includes the current sensing resistor 220 and a sense circuit 222. As described above, the sensing resistor 220 is coupled between the second isolation diode 202 and the system power terminal to sense the current from the USB power interface 230. The sense circuit 222 is coupled across the sensing resistor 220 and generates a sense signal (I-SENSE) indicative of the current level from the USB power interface 230. The sense signal can be a voltage or a current which is provided to the battery controller 104 for comparison with a reference corresponding to the predetermined (or a maximum) current capability of the particular USB power interface 230. Base on the comparison, the battery controller 104 determines the amount of excess power available to charge the battery and still remain in compliance with the USB standard or any other specification.

Figure 3:
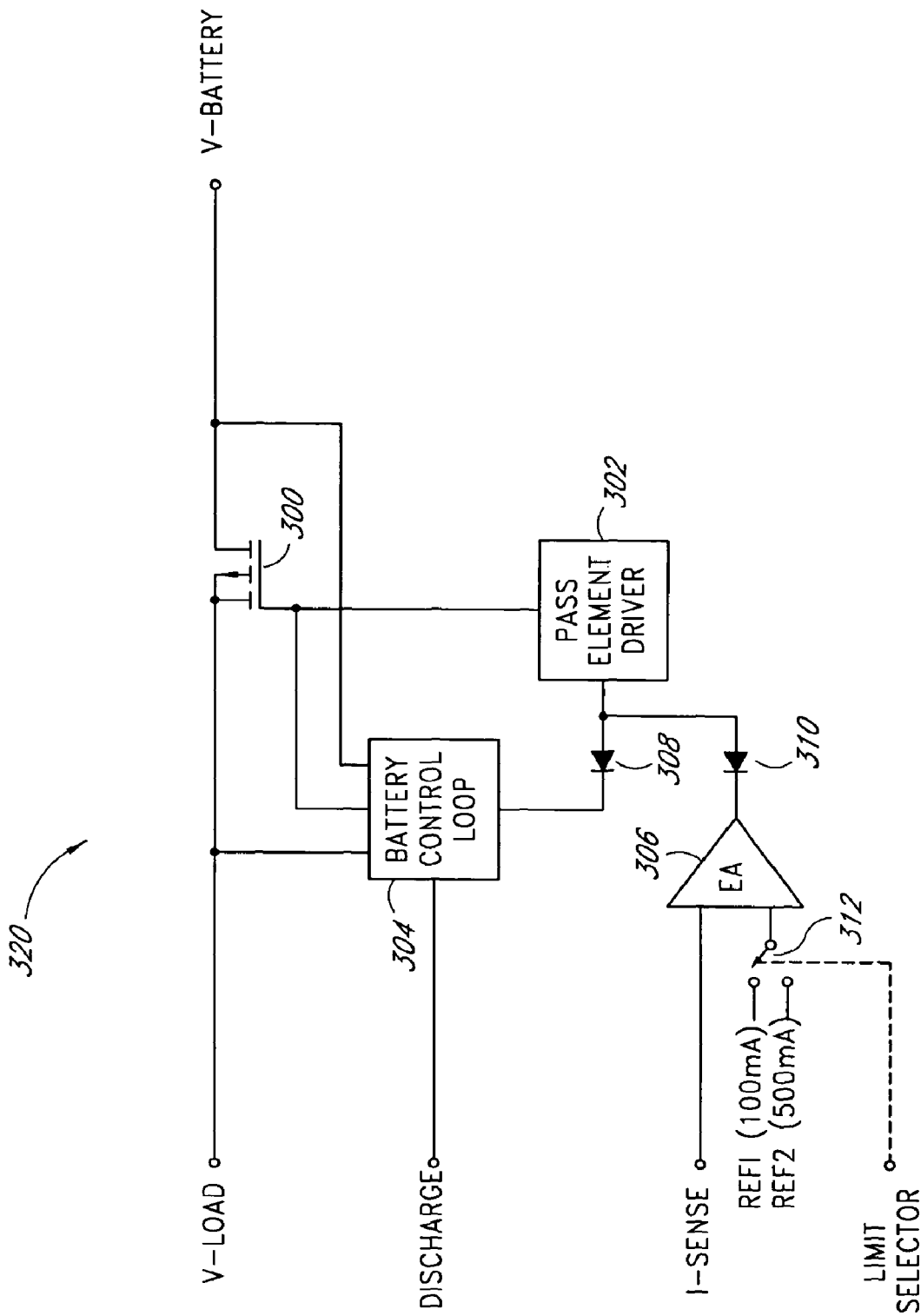
FIG. 3 is a schematic diagram of one embodiment of a battery controller.

FIG. 3 is a schematic diagram of one embodiment of a battery controller 320. The battery controller 320 includes a bi-directional device (or a pass element) 300 coupled between a system power terminal (V-LOAD) and a battery terminal (V-BATTERY). The bi-directional device 300 conducts a charging current in a first direction from the system power terminal to the battery terminal to charge a battery coupled to the battery terminal. The bi-directional device 300 also conducts a discharging current in a second (or opposite) direction from the battery terminal to the system power terminal to provide power to a system load coupled to the system power terminal. The bi-directional device 300 advantageously isolates the battery from the system load during charging of the battery and provides a relatively low-impedance path from the battery to the system load during discharging of the battery.

Furthermore, the bi-directional device 300 allows for regulation of the charging current, the discharging current, or both. In one embodiment, the bi-directional device 300 is a FET, such as a P-channel MOSFET shown in FIG. 3. The P-channel MOSFET 300 has a source terminal coupled to the system power terminal and a drain terminal coupled to the battery terminal. The voltage at a gate terminal of the P-channel MOSFET 300 can be varied to control (or regulate) the current flow through the P-channel MOSFET 300.

In one embodiment, a battery control loop 304 controls the various operating modes of the bi-directional device 300. For example, the battery control loop 304 determines whether to operate the bi-directional device 300 in a charge mode to charge the battery, a discharge mode to provide battery power to the system load, or a disabled mode to disconnect the battery from the system load. The battery control loop 304 can also determine the charging or discharging current levels. The operating modes and the current levels may be dictated by a system controller (not shown).

In one embodiment, the battery control loop 304 includes two inputs coupled to the system power terminal and the battery terminal respectively to automatically sense or determine the operating mode. For example, when the system power terminal is greater than the battery terminal by a first predefined amount, the battery controller 320 operates in the charge mode. When the system power terminal is less than the battery terminal by a second predefined amount, the battery controller 320 operates in the discharge mode. In one embodiment, the battery control loop 304 has a third input coupled to the gate terminal of the bi-directional device 300. The battery control loop 304 detects a voltage difference between the system power terminal and the battery terminal. The battery control loop 304 outputs a feedback control signal based on the voltage difference and the voltage at the gate terminal of the bi-directional device 300. The feedback control signal determines the direction and level of current conducted by the bi-directional device 300.

In one embodiment, the feedback control signal is provided to a pass element driver 302, which controls the conduction state of the bi-directional device 300. For example, an output of the pass element driver 302 is coupled to the gate terminal of the bi-directional device 300. The pass element driver 302 can vary the voltage at the gate terminal linearly to regulate or limit the charging current or the discharging current through the bi-directional device 300. At the same time, varying the voltage at the gate terminal desirably varies the impedance across the source-drain terminals of the bi-directional device 300. In one embodiment, the impedance varies inversely with the level of discharge current. The impedance is advantageously higher for low discharge currents to maintain a sufficient reverse voltage across the source-drain terminals to provide hysteresis in changing operating modes.

The battery controller 320 is capable of receiving power from a USB port. The USB port has limited power. Thus, the charging current conducted by the bi-directional device 300 may be limited so as not to demand power in excess of what the USB port can provide. In one embodiment, a current sensor monitors the supply current from the USB port as described above. An output of the current sensor (I-SENSE) is provided to an input terminal of an error amplifier 306. The error amplifier 306 compares the output of the current sensor with a selected reference level corresponding to a maximum (or a desired) current rating. For example, a first reference level (REF1) corresponds to a 100 mA supply current limit and a second reference level (REF2) corresponds to a 500 mA supply current limit. A logic signal (LIMIT SELECTOR) can control a switch 312 to choose which reference level to use based on a particular specification of the USB port.

An output of the error amplifier 306 is provided to the pass element driver 302. If the output of the current sensor indicates that the supply current exceeds the selected limit, the output of the error amplifier 306 overrides (or dominates) the output of the battery control loop 304 to decrease or suppress the charging current through the bi-directional device 300. The charging current varies as a load current to the system load changes so that the total current to both the system load and the battery at any given time does not exceed a predefined (or a maximum) rating when power is provided by the USB port.

In one embodiment, the output of the error amplifier 306 is wire OR-ed with the output of the battery control loop 304. For example, a diode 308 is coupled between the output of the battery control loop 304 and an input of the pass element driver 302. A diode 310 is coupled between the output of the error amplifier 306 and the input of the pass element driver 302. The diodes 308, 310 have commonly connected anodes coupled to the same input of the pass element driver 302. The diodes 308, 310 have cathodes coupled to the output of the battery control loop 304 and the output of the error amplifier 306 respectively.

In one embodiment, the discharge mode is enabled by an external discharge control signal (DISCHARGE). When the external discharge control signal is inactive, the bi-directional device 300 turns off to isolate the battery from the system load when the voltage at the battery terminal is greater than the voltage at the system power terminal. When the external discharge control signal is active, the bi-directional device conducts a discharging current from the battery to the system load when the voltage at the battery terminal is greater than the voltage at the system power terminal. In one embodiment, the battery control loop 304 controls the impedance of the bi-directional device 300 to limit the discharging current to a desired level.

Figure 4:
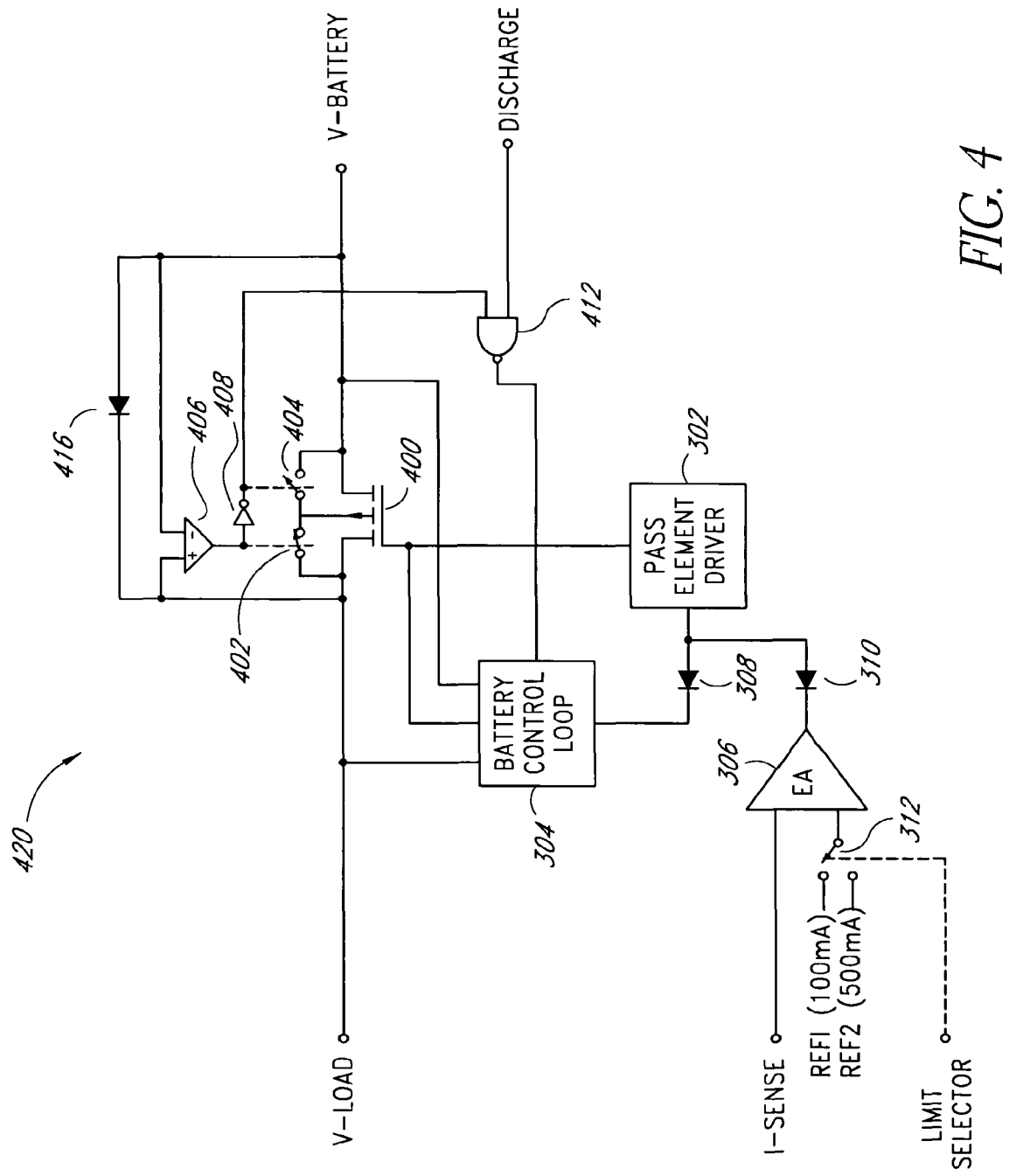
FIG. 4 is a schematic diagram of another embodiment of a battery controller.

FIG. 4 is a schematic diagram of another embodiment of a battery controller 420. Portions (e.g., the pass element driver 302, the battery control loop 304, the error amplifier 306) of the battery controller 420 illustrated in FIG. 4 is substantially similar to corresponding portions of the battery controller 320 illustrated in FIG. 3. Details of the similar portions will not be discussed further. The battery controller 420 of FIG. 4 illustrates a configurable body MOSFET 400 as a bi-directional device for conducting a charging current from a power source to a battery or a discharging current from the battery to a system load. The configurable body MOSFET 400 has source-drain terminals coupled to a system power terminal and a battery terminal respectively.

In one embodiment, the configurable body MOSFET 400 is a P-channel MOSFET with a floating body connection such that either side of the channel can be wired as a source terminal. For example, a configurable body contact can be coupled to the system power terminal (V-LOAD) by a first switch 402 to define the source terminal as connected to the system power terminal for the P-channel MOSFET 400. The configurable body contact can also be coupled to the battery terminal (V-BATTERY) by a second switch 404 to define the source terminal as connected to the battery terminal for the P-channel MOSFET 400.

The configurable body contact is coupled to the system power terminal during a battery charge mode and coupled to the battery terminal during a battery discharge mode. In one embodiment, a comparator 406 senses which side of the P-channel MOSFET 400 is a higher voltage and connects the body to that side of the channel to define the source terminal. For example, a positive input terminal of the comparator 406 is coupled to the system power interface. A negative input terminal of the comparator 406 is coupled to the battery terminal.

An output of the comparator 406 controls the first switch 402 to configure the terminal of the P-channel MOSFET 400 connected to the system power terminal as the source in the battery charge mode (e.g., when the voltage of the system power terminal is greater than the voltage of the battery terminal). In the battery charge mode, the P-channel MOSFET 400 functions as a linear regulator pass element and varying the degree of enhancement (or gate voltage) of the P-channel MOSFET 400 regulates a charging current to the battery.

The output of the comparator 406 is provided to an inverter 408, and an output of the inverter 408 controls the second switch 404. Thus, the second switch 404 operates in an opposite phase to the first switch 404. The second switch 404 configures the terminal of the P-channel MOSFET 400 connected to the battery terminal as the source in the battery discharge mode (e.g., when the voltage of the battery terminal is greater than the voltage of the system power terminal). In the battery discharge mode, the P-channel MOSFET 400 regulates a discharging current from the battery or can become a fully enhanced switch to allow current to flow unrestricted in reverse direction to the system load.

In one embodiment, the output of the inverter 408 is used to qualify a discharge command (DISCHARGE) and to engage the battery control loop 304 to commence a battery discharge mode. For example, the output of the inverter 408 is provided to a first input of a NAND logic gate 412. The discharge command is provided to a second input of the NAND logic gate 412. An output of the NAND logic gate 412 is provided to the battery control loop 304. Thus, when the battery terminal voltage is greater than the system power terminal voltage, the battery control loop 304 engages the pass element driver 302 and places the P-channel MOSFET 400 in the discharge mode if the discharge command is active.

In one embodiment, the configurable body contact allows a body diode of the P-channel MOSFET 400 to be connected to the battery terminal through the second switch 404, thereby allowing the pass element driver 302 to turn off the P-channel MOSFET 400 during a shutdown or disable mode to fully disconnect the battery from the system power terminal. In one embodiment in which full disconnection from the battery is not required, a switching diode 416 is coupled across the P-channel MOSFET 400 to improve a transient response by the battery. The switching diode 416 has an anode coupled to the battery terminal and a cathode coupled to the system power terminal. The switching diode 416 is a high-speed device that provides a faster switchover transient response when the battery provides power to the system load. The switching diode 416 is inactive during the battery charge mode.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A battery charger comprising:
    a first input configured to accept DC power from an AC adapter;
    a second input configured to accept DC power from a Universal Serial Bus power interface;
    a first output configured to provide power to a system load;
    a second output configured for connection to a battery;
    a first isolation circuit coupled between the first input and the first output to prevent current flow in a reverse direction to the first input;
    a second isolation circuit and a current sensing circuit coupled in series between the second input and the first output, wherein the second isolation circuit is connected in parallel with the first isolation circuit to the first output, and wherein the second isolation circuit prevents current flow in a reverse direction to the second input, and the current sensing circuit measures the current flow from the Universal Serial Bus power interface, wherein the current sensor is not coupled to the AC adapter;
    a pass element coupled between the first output and the second output, wherein the pass element conducts a charging current in a first direction to the second output during charging of the battery; and
    a charging controller configured to linearly regulate the charging current of the pass element based on the current flow from the Universal Serial Bus power interface measured by the current sensing circuit, and wherein the current sensing circuit does not measure the current flow from the AC adapter.

2. The battery charger of claim 1, wherein the charging controller reduces the charging current in response to an increase in current to the system load when the current flow from the Universal Serial Bus power interface exceeds a predefined current threshold.

3. The battery charger of claim 1, further comprising a current limiting circuit coupled between the Universal Serial Bus power interface and the second input.

4. The battery charger of claim 1, further comprising:
    a first bypass transistor coupled across the first isolation circuit; and
    a second bypass transistor coupled across the second isolation circuit, wherein the first bypass transistor and the second bypass transistor are selectively enabled to couple an output of the AC adapter or an output of the Universal Serial Bus power interface to the first output.

5. The battery charger of claim 4, wherein the second bypass transistor is automatically disabled when power is detected at the first input.

6. The battery charger of claim 1, wherein the first isolation circuit comprises a first diode with an anode coupled to the first input and a cathode coupled to the first output while the second isolation circuit comprises a second diode with an anode coupled to the second input and a cathode coupled to the first output.

7. The battery charger of claim 1, wherein the pass element is a series-connected transistor configured to additionally conduct current in a second direction from the second output to the first output during discharging of the battery.

8. The battery charger of claim 7, wherein discharging of the battery occurs when voltage at the second output is greater than voltage at the first output.

9. The battery charger of claim 7, wherein discharging of the battery occurs in response to a discharge command.

10. A battery controller comprising:
    a pass element coupled between a system power terminal and a battery terminal, wherein the system power terminal is alternately connected to DC power from an AC power source and DC power from a Universal Serial Bus power interface;
    a current sensor coupled in series between the DC power source and the system power terminal to measure a supply current from the Universal Serial Bus power interface, wherein the current sensor is not coupled to the AC power source;
    a battery control loop that senses a voltage difference between the system power terminal and the battery terminal, wherein the battery control loop outputs a feedback control signal based on the voltage difference; and
    a pass element driver that accepts the feedback control signal, wherein the pass element driver linearly regulates current conducted by the pass element using the feedback control signal, wherein the pass element driver linearly regulates the charging current based on the current flow from the Universal Serial Bus power interface measured by the current sensing circuit, and wherein the current sensing circuit does not measure current from the AC power source.

11. The battery controller of claim 10, wherein the pass element is a P-channel enhancement mode MOSFET with a source terminal coupled to the system power terminal and a drain terminal coupled to the battery terminal.

12. The battery controller of claim 10, wherein the pass element is a MOSFET with a configurable body contact.

13. The battery controller of claim 12, wherein the configurable body contact is coupled to the system power terminal during a charging mode and to the battery terminal during a discharging mode.

14. The battery controller of claim 12, wherein the configurable body contact is coupled to a transistor terminal with a relatively higher voltage during a shutdown mode to prevent current flow in a body diode and thereby fully disconnecting the battery terminal from the system power terminal.

15. The battery controller of claim 12, further comprising a comparator with inputs coupled across the MOSFET to sense a voltage polarity of the MOSFET to generate an output to control connections of the configurable body contact.

16. The battery controller of claim 10, wherein power is selectively provided to the system power terminal by an AC adapter or the Universal Serial Bus power interface.

17. The battery controller of claim 16, further comprising:
    a current sensor that outputs a current sense voltage indicative of the level of current supplied by the Universal Serial Bus power interface to the system power terminal; and
    an error amplifier that compares the current sense voltage to a reference level and overrides the feedback control signal to reduce the current conducted by the pass element when the current sense voltage exceeds the reference level.

18. The battery controller of claim 10, further comprising a switching diode coupled across the pass element to improve battery response during a discharging mode, wherein the switching diode is inactive during a charging mode.

* * * * *